(12) United States Patent
Lee et al.

(10) Patent No.: US 8,879,474 B2
(45) Date of Patent: Nov. 4, 2014

(54) METHOD AND APPARATUS FOR RECEIVING A MEDIUM ACCESS CONTROL PROTOCOL DATA UNIT HAVING A FRAGMENTATION AND PACKING EXTENDED HEADER

(75) Inventors: Eunjong Lee, Anyang-si (KR); Kiseon Ryu, Anyang-si (KR); Youngsoo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 13/578,240

(22) PCT Filed: Feb. 10, 2011

(86) PCT No.: PCT/KR2011/000894
§ 371 (c)(1),
(2), (4) Date: Oct. 24, 2012

(87) PCT Pub. No.: WO2011/099790
PCT Pub. Date: Aug. 18, 2011

(65) Prior Publication Data
US 2013/0039273 A1    Feb. 14, 2013

Related U.S. Application Data

(60) Provisional application No. 61/303,282, filed on Feb. 10, 2010, provisional application No. 61/308,313, filed on Feb. 26, 2010.

(30) Foreign Application Priority Data

Feb. 10, 2011  (KR) .................. 10-2011-0011690

(51) Int. Cl.
*H04W 4/00*   (2009.01)
*H04L 12/805* (2013.01)

(52) U.S. Cl.
CPC ........................... *H04L 47/36* (2013.01)
USPC .......................... 370/328; 370/474

(58) Field of Classification Search
None
See application file for complete search history.

(56) References Cited

U.S. PATENT DOCUMENTS

2008/0285501 A1 * 11/2008 Zhang et al. ............ 370/315
2009/0310537 A1 * 12/2009 Bucknell et al. ......... 370/328
2010/0054189 A1 *  3/2010 Chang et al. ............ 370/328

FOREIGN PATENT DOCUMENTS

| KR | 10-2006-0069378 | 6/2006 |
| KR | 10-2006-0080542 | 7/2006 |
| KR | 10-2008-0097133 | 11/2008 |
| KR | 10-2010-0005618 | 1/2010 |

OTHER PUBLICATIONS

IEEE P802.16m/D4—Feb. 3, 2010. Part 16: Air Interface for Fixed and Mobile Broadband Wireless Access Systems.*

* cited by examiner

*Primary Examiner* — David Oveissi
(74) *Attorney, Agent, or Firm* — Lee, Hong, Degerman, Kang & Waimey (57) ABSTRACT

The present invention relates to a method in which a receiver receives an MAC (medium access control) PDU (protocol data unit) in a wireless communication system. The method in which the receiver receives an MAC PDU comprises the following steps: receiving an MAC PDU containing a header and a payload from a transmitter, wherein the header includes a first extended header containing a first length field which indicates the length of a service data unit (hereinafter, referred to as "SDU") or lengths of fragmented SDUs in the MAC PDU; decoding the header; and determining whether the size of the first length field in the extended header is an extended size or a basic size in accordance with the results of decoding.

6 Claims, 6 Drawing Sheets

METHOD AND APPARATUS FOR RECEIVING A MEDIUM ACCESS CONTROL PROTOCOL DATA UNIT HAVING A FRAGMENTATION AND PACKING EXTENDED HEADER

CROSS-REFERENCE TO RELATED APPLICATIONS

This application is the National Stage filing under 35 U.S.C. 371 of International Application No. PCT/KR2011/000894, filed on Feb. 10, 2011, which claims the benefit of earlier filing date and right of priority to Korean Application No. 10-2011-0011690, filed on Feb. 10, 2011, and also claims the benefit of U.S. Provisional Application Ser. No. 61/308,313, filed on Feb. 26, 2010, and U.S. Provisional Application Ser. No. 61/303,282, filed on Feb. 10, 2010, the contents of which are all incorporated by reference herein in their entirety.

FIELD OF THE INVENTION

The present invention relates to a method and apparatus for receiving a medium access control protocol data unit (MAC PDU), and more particularly to a method and apparatus for receiving the medium access control protocol data unit (MAC PDU) accompanying a fragmentation and packing extended header.

BACKGROUND ART

A general header for use in a wireless access system will hereinafter be described.

A medium access control protocol data unit (MAC PDU) for use in a medium access control (MAC) layer will hereinafter be described in detail.

A MAC layer (or a link layer) located below a second (L2) layer and a physical layer has been designed to use different protocols according to various wireless access systems, for example, a local area network (LAN), a wireless LAN, 3GPP/3GPP2, a wireless MAN, etc. Therefore, a header format of the MAC PDU is defined in different ways according to individual wireless access systems.

Example of MAC PDU Format

Figure 1:
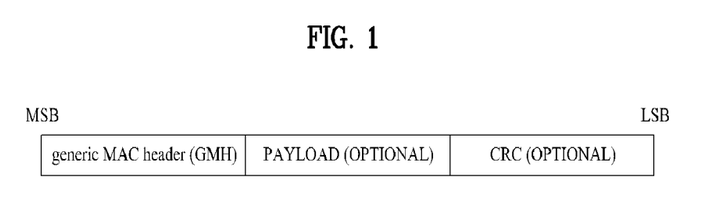
FIG. 1 shows an example of a MAC PDU format for use in an IEEE 802.16e system acting as one of the wireless access systems.

FIG. 1 shows an example of the MAC PDU format for use in an IEEE 802.16e system acting as one of the wireless access systems.

Referring to FIG. 1, a MAC PDU may include a generic MAC header (GMH) field, a payload field, and a cyclic redundancy check (CRC) field. The generic MAC header (GMH) is used for data transmission between individual nodes at a link layer. The generic MAC header (GMH) may include a MAC address or a link address, and may include a header error check and control information of a link layer.

The payload indicates a specific part including actual data to be transmitted at a MAC PDU. In addition, CRC indicates a scheme for determining a check value used for checking the presence or absence of an error in transmission data when data is transmitted over a network or the like. However, the payload and the CRC may be optionally contained in a MAC PDU, whereas the generic MAC header (GMH) is always contained in the MAC PDU.

DETAILED DESCRIPTION OF THE INVENTION

Technical Problem

A generic MAC header (GMH) includes a length field indicating a total length of the MAC PDU. If the length of data to be transmitted is longer than the length of a MAC PDU capable of being represented by the length field of the generic MAC header (GMH), a transmitter fragments the data into a plurality of sections and transmits the data sections. In addition, if the length of data to be transmitted is shorter than the length of a MAC PDU capable of being represented by the length field contained in the generic MAC header (GMH), the transmitter can pack another data to be transmitted into the MAC PDU, and transmit the resultant MAC PDU. Each MAC PDU including fragmented or packed data may include an extension header indicating the order and length of data contained in the payload.

In this case, since several length fields contained in the MAC PDU have different sizes, the length of data capable of being represented by each length field may be limited in different ways. In other words, if the length field contained in a fragmentation and packing extended header is smaller than the length field contained in the generic MAC header (GMH) indicating the length of MAC PDU, data capable of being composed of a single MAC PDU may also be composed of a plurality of MAC PDUs due to limitation of the length field contained in the extension header, so that the data composed of the plurality of MAC PDUs can be transmitted.

Accordingly, the present invention is directed to an apparatus and method for transmitting/receiving uplink transmission power control information in a multi-carrier support communication system that substantially obviate one or more problems due to limitations and disadvantages of the related art. An object of the present invention is to provide a method for efficiently transmitting/receiving a MAC PDU.

Another object of the present invention is to provide a method for efficiently transmitting/receiving a MAC PDU to implement data having a longer length (e.g., data having a length of at least 2047 bytes).

Another object of the present invention is to provide a method for efficiently transmitting/receiving a MAC PDU to implement data having a total length increased by packing of several data parts (e.g., data having a length of at least 2047 bytes).

Another object of the present invention is to provide a new header structure for transmitting and receiving large-sized data.

Another object of the present invention is to provide an apparatus for performing the above-mentioned methods.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The present invention provides a method for receiving a MAC PDU by a receiver in a wireless communication system.

The object of the present invention can be achieved by providing a method for receiving a medium access control (MAC) protocol data unit (PDU) by a receiver in a wireless communication system, the method including: receiving the MAC PDU including a header and a payload from a transmitter, wherein the header includes a first extended header containing a first length field which indicates a length of a service data unit (SDU) or lengths of fragmented SDUs in the MAC PDU; decoding the header; and determining whether the size of the first length field in the first extended header is an extended size or a basic size according to the decoding result.

The first extended header may be a fragmentation and packing extended header (FPEH). The first extended header may be a packing extended header (PEH).

The first length field may have a basic size of 11 bits, and may have an extended size of 14 bits.

The decoding step may be a process for determining whether a MAC PDU length extension header (MLEH) is contained in the header, wherein, if the MLEH is present in the header, the size of the first length field is determined to be an extended size.

The first extended header may further include a first length indicator indicating the size of the first length field. The decoding step may confirm the first length indicator. If the first length indicator may indicate an extended size, the size of the first length field is determined to be an extended size.

The header may further include a multiplexing extended header (MEH) containing a second length field and a second length indicator indicating the size of the second length field. The decoding step confirms the second length indicator. If the second length indicator indicates an extended size, the size of the second length field is determined to be an extended size.

In another aspect of the present invention, a user equipment (UE) for receiving a medium access control (MAC) protocol data unit (PDU) in a wireless communication system includes a memory; a radio frequency (RF) unit for transmitting/receiving an external signal and a radio frequency (RF) signal; and a control unit configured to control reception and decoding of the MAC PDU.

The control unit receives the MAC PDU including a header and a payload from an eNode B, the header including a first extended header containing a first length field which indicates a length of a service data unit (SDU) or lengths of fragmented SDUs in the MAC PDU, decodes the header, and determines the size of the first length field contained in the first extended header to be any one of a basic size and an extended size according to the decoding result.

Effects of the Invention

As is apparent from the above description, the embodiments of the present invention have the following effects.

The wireless communication system according to the embodiments of the present invention can determine the size of a length field of a packing extended header to an extended size. Therefore, when transmitting a plurality of MAC SDUs in which the length of some MAC SDUs is longer than 2047 bytes within one connection in the wireless communication system, provided that the length field of the packing extended header has an extended size, the MAC SDU is packed into one MAC PDU so that the resultant MAC PDU can be transmitted and received, resulting in reduction in transmission/reception overhead.

The wireless communication system according to one embodiment of the present invention can determine the size of the length field contained in the fragmentation and packing extended header on the basis of the presence or absence of a MAC PDU length extended header contained in the MAC PDU, so that the fragmentation and packing extended header can be decoded without using an additional indicator indicating the size of the length field contained in the fragmentation and packing extended header.

The wireless communication system according to one embodiment of the present invention can represent an extended size of the length field contained in the fragmentation and packing extended header only when data packing is achieved, such that overhead caused by the extended size is not generated when data packing is not achieved.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

The following embodiments of the present invention relate to a method and apparatus for transmitting data in a wireless access system. Technology to be described in the following embodiments relates to a method and apparatus for receiving a MAC PDU including a fragmentation header.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as an IEEE 802.16m system, but the present invention is not limited thereto and the remaining parts of the present invention other than unique characteristics of the IEEE 802.16m system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like. A relay may refer to a relay node (RN), a relay station (RS), or the like.

A transmitter is a mobile node and/or a fixed node that transmits voice or data service and a receiver is a mobile node and/or a fixed node that receives voice or data service. Hence, an MS may be a transmitter and a BS may be a receiver in uplink. Likewise, the MS may be a receiver and the BS may be a transmitter in downlink.

Example of MAC PDU

Figure 2:
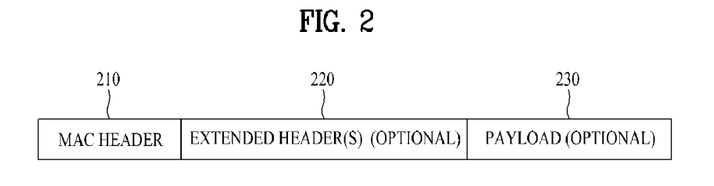
FIG. 2 shows an example of a MAC PDU for use in the embodiments of the present invention.

FIG. 2 shows an example of a MAC PDU for use in the embodiments of the present invention.

Referring to FIG. 2, each MAC PDU may include a MAC header 210, at least one extended header 220, and a payload 230. The MAC PDU starts from the MAC header, and at least one extended header 220 may be located after the MAC header. The payload may be located after the MAC header. If the extended header 220 is contained in the MAC PDU, the payload may be located after the extended header. In FIG. 2, the extended header 220 and the payload 230 may be optionally contained in the MAC PDU. At least one extended header is not present in the MAC PDU without using the payload.

Three MAC headers are defined in the IEEE 802.16m system. The first MAC header is an Advanced Generic MAC Header (AGMH) for use in uplink/downlink MAC PDUs including a MAC control message and/or convergence sublayer data. The second MAC header is a Compact MAC Header (CMH) for use in MAC PDUs of connections for either persistent allocation supporting a VoIP service or group allocation. The third MAC layer is a MAC Signaling Header (MSH) that is coupled to a different MAC PDU or transmitted alone.

It is assumed that the MAC header 210 shown in FIG. 2 uses an AGMH newly defined in the present invention instead of using a generic MAC header (GMH) (See FIG. 1) defined in the IEEE 802.16e system.

AGMH Format

Figure 3:
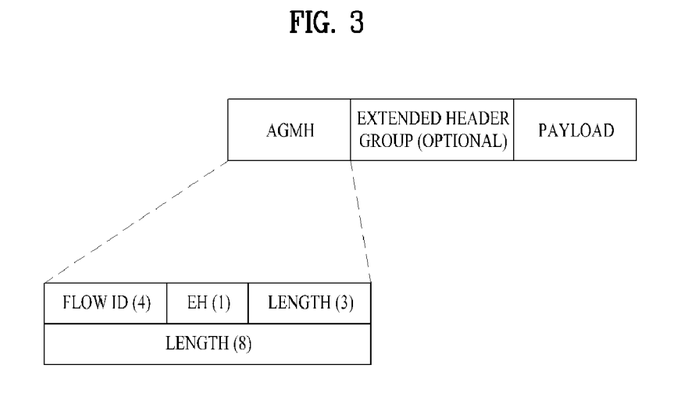
FIG. 3 shows an example of a Advanced Generic MAC Header (AGMH) for use in the embodiments of the present invention.

FIG. 3 shows an example of a Advanced Generic MAC Header (AGMH) for use in the embodiments of the present invention. The AGMH format is defined as the following Table 1.

TABLE 1

| Syntax | Size (bit) | Contents |
|---|---|---|
| Advanced Generic MAC Header( ){ | | |
| Flow ID | 4 | Flow ID |
| EH | 1 | Extended Header Presence Indicator: If EH field is set to 1, the extended header is located after AGMH. |
| Length | 11 | If AGMH and the extended header are present, this length field indicates the length of MAC PDU including the AGMH and the extended header in units of a byte. If MLEH is present in MAC PDU, the length field indicates the length of MAC PDU as 11 LSBs. |
| } | | |

Referring to Table 1, AGMH is data 16 bits long, and may include a flow ID, an extended header (EH) presence indication field, and a length field.

In this case, the flow ID indicates a service flow connection through which the corresponding MAC PDU is transmitted, and the EH field indicates whether the extended header (EH) is located after the AGMH. In addition, the length field contained in the AGMH is 11 bits long, and indicates the total length of a MAC PDU. The MAC PDU capable of being represented using only the 11-bit length field contained in the AGMH is 2047 bytes long in maximum.

Example of Extended Header Group (EHG)

Figure 4:
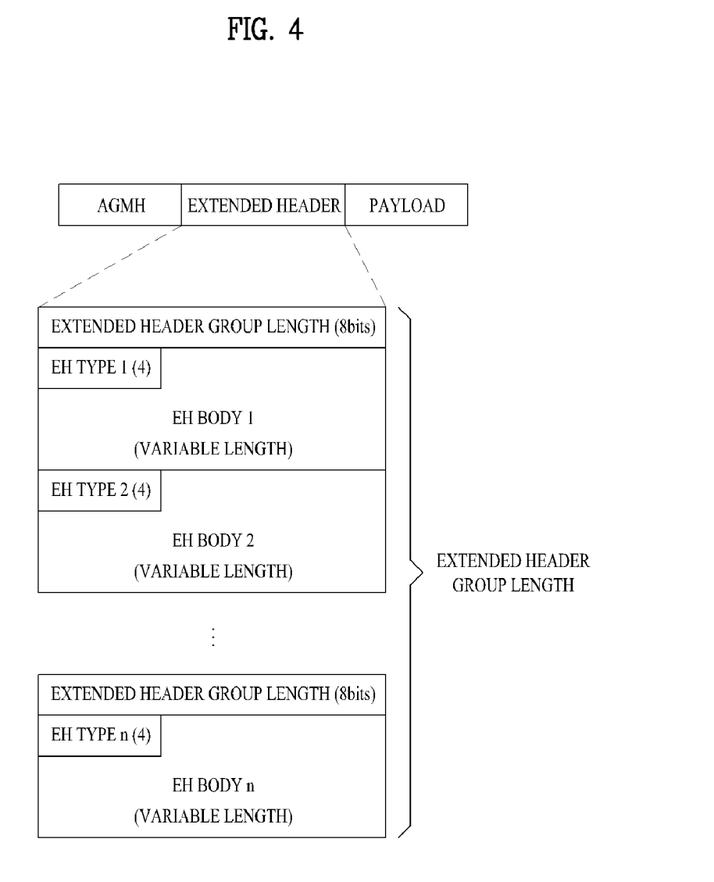
FIG. 4 shows an example of an extended header group for use in the embodiments of the present invention.

FIG. 4 shows an example of an extended header group (EHG) for use in the embodiments of the present invention.

A receiver can recognize information as to whether EHG is contained in a MAC PDU using the EH field of the AGMH. If EHG is contained in the MAC PDU, this EHG is located just after the AGMH. The EHG is not encrypted, and is not present in the MAD PDU under the condition that there is no payload.

Table 2 shows an example of the EHG field.

TABLE 2

| Syntax | Size (bits) | Contents |
|---|---|---|
| Extended Header Group (EHG) length | 8 | EHG field indicates a total length of EHG including all extended headers (EHs) in units of a byte. |
| Extended Header Type | 4 | EH type refer to Table 3 |
| Extended Header Body | Variable | EH size is determined by EH type defined in Table 3. EH including EH type is allocated in units of a byte. |

Referring to Table 2, the extended header (EH) group includes an extended header group (EHG) length field, at least one extended header (EH) type field, and at least one extended header (EH) body field. In this case, the extended header group (EHG) length field indicates a total length of the extended header group (EHG) including all extended headers (EHs). The EH type field indicates a type of each extended header (EH) contained in the extended header group (EHG). In addition, the size of the extended header body field is determined according to each extended header type field.

Table 3 shows an example of the extended header type field.

TABLE 3

| Extended Header Type | Name |
|---|---|
| 0b0110 | Fragment and packing Extended Header |
| — | MAC Control Extended Header |
| 0b0000 | Multiplexing Extended Header |
| 0b0001 | Message ACK Extended Header |
| 0b0010 | Sleep control Extended Header |
| 0b0011 | Correlation matrix feedback Extended Header |
| 0b0100 | MIMO feedback Extended Header |
| 0b0101 | Piggybacked bandwidth request Extended Header |
| 0b0111 | MAC PDU length Extended Header |
| 0b1000 | ARQ feedback Extended Header |
| 0b1001-0b1111 | Reserved |

Referring to Table 3, it is possible to recognize the type of extended headers capable of being used in FIG. 4.

As described above, a MAC PDU capable of being represented using only an 11-bit length field contained in an AGMH is 2047 bytes long in maximum. Therefore, the transmitter must fragment into the corresponding data into a plurality of data units so as to transmit a service data unit (SDU) corresponding to at least 2047 bytes long, so that the transmitter can generate one or more MAC PDUs. Because of the above-mentioned SDU fragmentation, AMC control overhead may occur. For example, each fragmentation MAC PDU must include an AGMH, and must separately include a sequence number (SN) indicating the order of each fragmented packet. For this purpose, a MAC PDU including each fragmentation packet may include a fragmentation and packing extended header (FPEH) acting as an extended header including fields associated with SDU fragmentation. A detailed description of FPEH will be described later with reference to FIG. 7.

In addition, a certain extended header from among a plurality of extended headers (EHs) may be used to extend size limitation of the length field contained in an AGMH. For example, the MAC PDU length extension header (MLEH) has a length field being 3 bits long, a length field of the AGMH is concatenated with a length field of the MLEH, so that the total length of MAC PDU can be represented using the size of 14 bits. A detailed description of MLEH will be described later with reference to FIG. 5.

Example of MAC PDU Including MLEH

Figure 5:
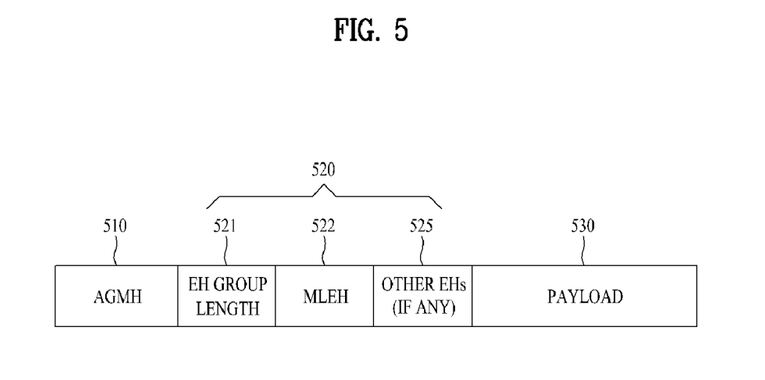
FIG. 5 shows an example of a MAC PDU structure including a MAC PDU Length Extension Header (MLEH) for use in the embodiments of the present invention.

FIG. 5 shows an example of a MAC PDU structure including a MAC PDU Length Extension Header (MLEH) for use in the embodiments of the present invention.

MLEH is a new extension header that is defined for transmitting relatively large-sized data to a single MAC PDU. That is, considering that the length field contained in the AGMH is 11 bits long, the MAC PDU capable of being transmitted is 2047 bytes or less. Therefore, when the transmitter transmits a MAC PDU corresponding to at least 2047 bytes long, the length of the MAC PDU including the MLEH can be increased.

Referring to FIG. 5, the MAC PDU may include an AGMH 510, an extended header group (EHG) 520, and a MAC payload 530. In this case, the AGMH 510 may include a flow ID composed of 4 bits, an EG bit composed of 1 bit, and a length field composed of 11 bits. The extended header group (EHG) 520 may include an extended header (EH) group length field 521, an MLEH 522 including a type field and a length field, and other extended headers 525. The length field contained in the MLEH shown in FIG. 5 indicates a total length of a MAC PDU in the same manner as the length field of the AGMH defined in Table 1.

If a total length of a MAC PDU is at least 2047 bytes, the transmitter transmits a MAC PDU including an MLEH shown in FIG. 5 to the receiver. The receiver having decoded the MLEH can calculate the total length of the corresponding MDPU using the length field of the MAC PDU contained in the MLEH and the length field of the AGMH. If the MLEH is used along with other extended headers (EHs), the MLEH is used as a first extension header so that it is located at the foremost position before other EHs.

Table 4 shows an exemplary MLEH.

TABLE 4

| Syntax | Size (bits) | Contents |
|---|---|---|
| MLEH( ){ | | |
| Type | 4 | Indicating length extended header type |
| Length | 3 | Length field of 3 bits is added as MSB of 11-bit length field of AGMH. That is, MAC PDU length is MLEH (Length(3)) . . . AGMH (Length(11)) |
| Reserved | 1 | This field is set to zero (0) |
| } | | |

Referring to Table 4, the type field indicates that the corresponding extended header is added to transmit large-sized data, and the length field as well as the AGMH length field indicates the length of a total MAC PDU.

If MLEH is contained in a MAC PDU, the MLEH is located at the foremost position before other extended headers (EHs) in the corresponding MAC PDU. For example, MLEH is located just after AGMH and is also located prior to payload. If the MLEH is used along with other extended headers (EHs), it is more preferable that the MLEH may appear at the foremost position prior to other extended headers (EHs) within the extended header group (EHG), because the receiver must firstly decode the MLEH so as to recognize the size of a total MAC PDU.

The MLEH length field is used as 3 bits corresponding to Most Significant Bits (MSBs) having an extended length of the MAC PDU. The AGMH length field may be used as 11 bits corresponding to Least Significant Bits (LSBs) having an extended length of the MAC PDU.

In the case of using the MLEH shown in Table 4, the transmitter can transmit a MAC PDU ranging from 2047 bytes to 32767 bytes.

Example of MEH

Figure 6:
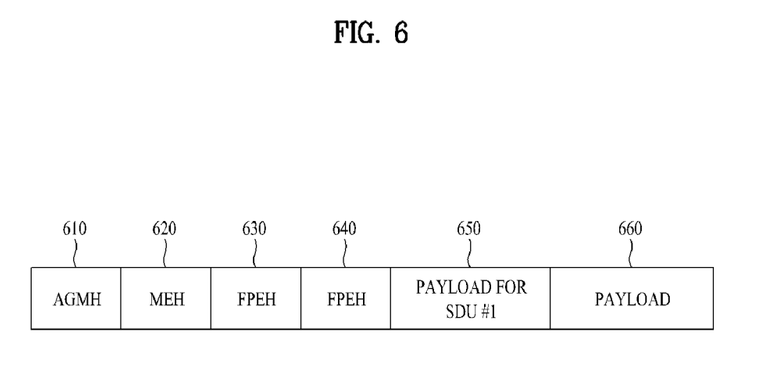
FIG. 6 shows an example of a MAC PDU structure including a Multiplexing Extended Header (MEH) for use in the embodiments of the present invention.

FIG. 6 shows an example of a MAC PDU structure including a Multiplexing Extended Header (MEH) for use in the embodiments of the present invention.

The multiplexing extended header (MEH) is used, when data from a plurality of connections is contained in one MAC PDU and the resultant MAC PDU is transmitted. The MEH is used, when payload from a different connection having the same security association (SA) as first connection corresponding to a flow ID contained in the AGMH is contained in the MAC PDU. The MEH may include flow IDs of other multiplexed connections.

Referring to FIG. 6, MAC PDU may include an AGMH 610, an MEH 620, a first FPEH 630, a second FPEH 640, a first payload 650, and a second payload 660. In this case, the AGMH 610 may include a first flow ID, and the MEH 620 may include a second flow ID having the same SA as the first flow ID. In addition, the MAC PDU may multiplex the first payload 650 corresponding to the first flow ID and the second payload 660 corresponding to the second flow ID. If the MEH and the FPEH are simultaneously contained in one MAC PDU, the MEH must be located before the FPEH. The above-mentioned example in which the MEH and the FPEH are simultaneously contained in one MAC PDU will be described later with reference to FIG. 7.

Table 5 shows an exemplary MEH format.

TABLE 5

| Syntax | Size (bits) | Contents |
|---|---|---|
| MEH( ){ | | |
| Type | TBD | This indicates a multiplexing extended header (MEH). |

TABLE 5-continued

| Syntax | Size (bits) | Contents |
| --- | --- | --- |
| N_FID | 4 | This indicates the number of flow information present in MEH, N connections are multiplexed, (N − 1) flow IDs and (N − 1) length fields exist. |
| For (i=1; i≤N_FI;i++){ | | |
| Flow ID | 4 | This indicates a flow ID. The i-th flow ID indicates a flow ID of (i + 1)-th connection. |
| LI | 1 | This indicates a length indicator. If LI is set to 0, this field indicates the size of a length field 11 bits long. If LI is set to 1, this field indicates the size of a length field 14 bits long. |
| If (LI == 0){ | | |
| Length | 11 | This indicates a length of connection payload. The i-th length field indicates the length of payload of the (i + 1)-th connection. Length of payload of first connection = total length of a MAC PDU (given by AGMH and MLEH length fields) − Length of PN and EKS (in case of existence) − Length of ICV (in case of existence) − the sum of (n − 1) length field |
| }else{ | | |
| Length | 14 | This indicates a length of connection payload. The i-th length field indicates the length of payload of the (i + 1)-th connection. Length of payload of first connection = total length of MAC PDU (given by AGMH and MLEH length fields) − Length of PN and EKS (in case of existence) − Length of ICV (in case of existence) − the sum of (n − 1) length field |
| Reserved | 1 | |
| } | | |
| FPEH_MCEH_indicator bitmap | Variable | The number of bits of FPEH_MCEH_indicator bitmap is identical to the number of flows multiplexed in MAC PDU. (That is, N_FI + I). MSB corresponds to payload of first connection. LSB corresponds to payload of the last connection. |
| Reserved | Variable | |

Referring to Table 5, a type field indicates a multiplexing extended header (MEH), N_FID field indicates the number of flow information contained in MEH. Thereafter, a flow ID, a length indicator, a length field, etc. corresponding to each flow information of the MEH are contained in the MEH.

Use Example of FPEH

Figure 7:
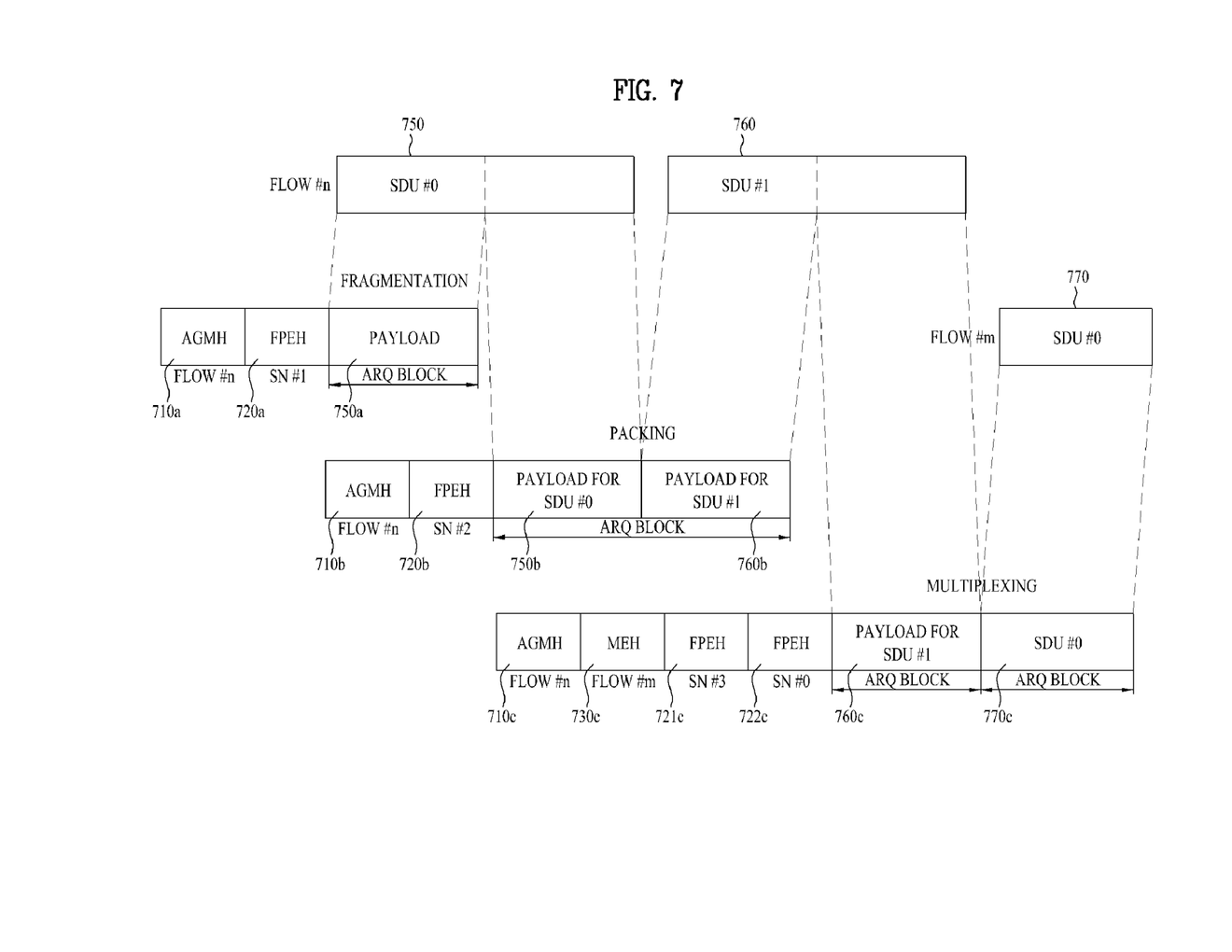
FIG. 7 shows an example of a MAC PDU structure including an FPEH for use in the embodiments of the present invention.

FIG. 7 shows an example of a MAC PDU structure including an FPEH for use in the embodiments of the present invention.

Data from a transport connection is configured in the form of MAC SDU and is then provided to a MAC layer. If fragmentation or packing of the PACK SDU may be carried out or if SN is applied to the MAC PDU, the MAC PDU must include an FPEH. That is, if the MAC SDU is fragmented or packed, fragmentation or packing information of the SDU can be recognized using the FPEH.

Referring to FIG. 7, SDU #0 (750) and SDU #1 (760), each of which has a flow ID #n of the transmitter, and SDU #9 (770) having a flow ID #m are provided to the MAC layer. If the length of data of SDU #0 (750) of a flow #n is longer than the total length of a MAC PDU indicated by a length field contained in AGMH 710a, SDU #0 (750) is fragmented into a first payload 750a and a second payload 750b so as to be transmitted through the two MAC PDUs. If the fragmented data from one SDU is contained in payload, the MAC PDU includes FPEHs (i.e., a first FPEH 720a and a second FPEH 720b) including SN of the fragmented data.

On the other hand, one MAC PDU may be packed to include an SDU having the same flow ID. That is, a third payload 760b and a second payload 750b are packed into one MAC PDU. In this case, the third payload 760b is a part of data of SDU #1 corresponding to a different SDU having the same flow #n as the second payload 750b to be packed into one MAC PDU. In this case, the length of the third payload 760b corresponds to a length obtained when the length of the second payload 750b is subtracted from the length of a MAC PDU represented by the length field of the AGMH 710b. The second FPEH 720b is used as an extended header for packing the second payload 750b and the third payload 760b. As a result, the remaining parts of the SDU #1 (760) are contained as a fourth payload 760c in a different MAC PDU.

Meanwhile, one MAC PDU may be multiplexed to include an SDU having a different flow ID. That is, a fourth payload 760c having a flow ID #n may be multiplexed so that the fourth payload 760c and a fifth payload 770c acting as data of SDU #0 (770) having a different flow ID #m can be contained in one PDU. A header and an extended header of the multiplexed MAC PDU include a flow ID and SN information corresponding to each payload. That is, in association with the fourth payload 760c, a flow ID #n may be indicated by a flow ID of the AGMH 710c, and a sequence number (SN #3) may be indicated by a third FPEH 721c. In addition, in association with the fifth payload 770c, a flow ID #m may be indicated by a flow ID of an MEH 730c, and a sequence number (SN #0) may be indicated by a fourth FPEH 722c.

If MAC SDU for use in the embodiments of the present invention is fragmented or packed, the fragmentation or packing information of the SDU may be contained in FPEH. For example, fragmentation information of the SDU may be contained in FEH, and packing information of the SDU may be contained in a PEH.

The relationship between length fields contained in the MAC PDU will hereinafter be described in detail. In the case of using the length fields contained in AGMH and MLEH, a maximum length of one MAC PDU may be denoted by $(2^{14}-1)$ bytes. Fragmentation or non-fragmentation of SDU and the size of SDU data to be packed may be determined according to whether the size of SDU to be transmitted through the MAC layer is contained in a single MAC PDU.

In more detail, FPEH indicating fragmentation or packing information of the SDU must include a length field indicating the length of fragmented or packed SDU or the length of fragmented SDU (i.e., SDU fragmentation). In this case, it is necessary to reflect a maximum total length of the MAC PDU into fragmentation of SDU of payload contained in the FPEH and the length field of packed SDU. That is, a maximum total length of MAC PDU may be denoted by $(2^{14}-1)$ bytes capable of being represented by 14 bits using the length fields contained in AGMH and MLEH. However, assuming that the length field of the FPEH is 11 bits long, SDU data capable of being contained in one MAC PDU is contained in a plurality of MAC PDUs, resulting in the occurrence of overhead.

For this purpose, according to the wireless communication system, the length field of an extended header including fragmentation or packing information is configured to have the same-sized space as the length field indicating the total length of MAC PDU. In more detail, when a maximum total length of MAC PDU is denoted by $(2^{14}-1)$ bytes, the length field of the extended header including fragmentation or packing information of SDU pertaining to the MAC PDU may be at least 14 bits long. As a representative example of the extended header including fragmentation or packing information, an FPEH will hereinafter be described in detail.

Method for Receiving MAC PDU

A method for receiving an MAC PDU including fragmentation or packing extended header by a receiver (for example, a UE) in a wireless communication system according to one embodiment of the present invention will hereinafter be described in detail.

Figure 8:
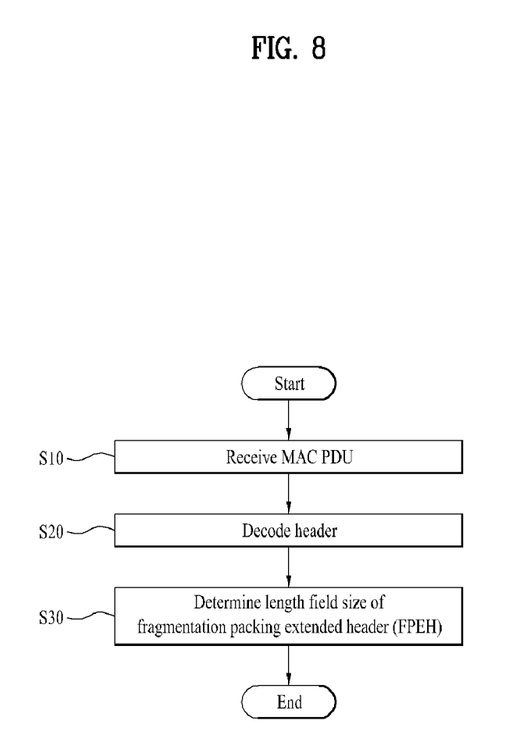
FIG. 8 is a flowchart illustrating a method for receiving a MAC PDU by a receiver in a wireless communication system according to embodiments of the present invention.

FIG. 8 is a flowchart illustrating a method for receiving a MAC PDU by a receiver in a wireless communication system according to embodiments of the present invention.

Referring to FIG. 8, the receiver includes a MAC PDU including a MAC header and a payload from the transmitter at step S10. The MAC header may include an FPEH for fragmentation or packed data contained in the payload. The FPEH may include a length field indicating the length of fragmented or packed SDU pertaining to payload.

Thereafter, the receiver decodes a header of the received MAC PDU at step S20. The process for decoding the header may be used to determine the size of the length field contained in the FPEH. For example, the process for decoding the header may be used to determine whether the length of the received MAC PDU from among information contained in the MAC PDU header is represented by 11 bits using only the length field contained in an AGMH, or to determine whether the length of the received MAC PDU is represented by 14 bits by concatenating the length field contained in an MLEH with the length field of AGMH.

The receiver can determine the size of the length field contained in an FPEH on the basis of the decoded result of the MAC PDU header at step S30. In more detail, if the MAC PDU length is represented by the length field 11 bits long, the receiver determines that the length field of FPEH has a basic size corresponding to 11 bits long. In addition, provided that the MAC PDU length is represented by the length field of 14 bits, it is determined that the FPEH length field is 14 bits long corresponding to an extended size.

Although the above-mentioned description has exemplarily disclosed the FPEH for convenience of description, the above-mentioned MAC PDU reception method can also be applied to a different extended header including fragmentation or packing data information capable of being contained in a MAC PDU. For example, the above-mentioned extended header including the fragmentation or packing data information may be a MAC SDU fragmentation extended header (FEH) or a MAC SDU packing extended header (PEH).

In addition, the receiver for performing the above-mentioned MAC PDU reception method for use in the wireless communication system according to one embodiment of the present invention may be a base station (BS) or eNode B (eNB) on uplink, or may be a mobile station (MS) or UE on downlink.

Methods for determining the size of the length field of FPEH contained in the MAC PDU by decoding the received MAC PDU will hereinafter be described with reference to the embodiments of the present invention.

Example of FPEH (First Embodiment)

A first embodiment of the present invention relates to a method for determining the FPEH length field according to whether an MLEH is contained in the MAC PDU received by the receiver. In the step for decoding the MAC PDU header, a process for determining whether an MLEH is contained in the header is carried out in the first embodiment of the present invention. If the MLEH is present in the header according to the decoding result, the FPEH length field is configured to have an extended size. If the MLEH is not present in the header, the FPEH length field is configured to have a basic size. Table 6 shows an exemplary FPEH for use in the first embodiment.

TABLE 6

| Syntax | Size (bits) | Contents |
|---|---|---|
| FPEH( ){ | | |
| Type | 4 | FPEH type |
| FC | 2 | Including fragmentation control information |
| If (MAC header == AGMH){ | | |
| SN | 10 | SN is maintained in units of connection. In association with non-ARQ connection, SN indicates a sequence number of MAC PDU including payload, and SN value is increased one by one for each MAC PDU. In association with ARQ connection, SN denotes an ARQ block sequence number. |
| AFP | 1 | Including ARQ feedback poll indicator. '0' indicates inclusion of ARQ feedback poll. '1' indicates inclusion of ARQ feedback poll related to connection indicated by AGMH or MEH (in case of multiplexing) |

TABLE 6-continued

| Syntax | Size (bits) | Contents |
|---|---|---|
| RI | 1 | Including ARQ rearrangement information indicator, '0' indicates the ARQ rearrangement is not indicated. '1' indicates that ARQ rearrangement is indicated. |
| If(RI==1){ | | |
| LSI | 1 | Last ARQ sub-block indicator. '0' indicates that a single ARQ block not contained in the corresponding MAC PDU indicates the last ARQ subblock. '1' indicates that a single ARQ block contained in the corresponding MAC PDU indicates the last ARQ subblock. |
| SSN | 11 | Sub-sequence number of the first ARQ subblock |
| }} | | |
| Do{ | | |
| End | 1 | |
| If(End == 0){ | | |
| If(!MLEH){ | | If there is an MLEH, the length field is extended to the size of 14 bits. If there is no MLEH, the length field is 11 bits long. |
| Length | 11 | This field indicates a length of either an SDU or a SDU fragment of the fragmented SDU. |
| }else{ | | |
| Length | 1 | This field indicates a length of either an SDU or a SDU fragment of the fragmented SDU. |
| } | | |
| } | | |
| }while(!End) | | |
| Reserved | Variable | |
| } | | |

Referring to Table 6, if MLEH is present in the MAC PDU, the MLEH is an extended header located at a first position from among extended headers. Therefore, the receiver having received the MAC PDU can recognize the presence or absence of an MLEH before decoding the FPEH, so that it is possible to decode the FPEH length field into the size of 14 bits when there is an MLEH.

Example of FPEH (Second Embodiment)

The second embodiment of the present invention relates to a method for including a length indicator indicating the length-field size in an FPEH, and confirming a value of the FPEH length indicator of the MAC PDU received by the receiver, so that it can determine the FPEH length field according to the confirmed value. Therefore, when decoding a header of the MAC PDU in the second embodiment of the present invention, a process for confirming a value of the length indicator contained in the FPEH is carried out. If the length indicator is set to '1' according to the decoded result, the size of FPEH length field is determined to be the extended size. If the length indicator is set to '0' according to the decoded result, the size of FPEH length field is determined to be a basic size. Table 7 shows an exemplary FPEH for use in the second embodiment of the present invention.

TABLE 7

| Syntax | Size (bits) | Contents |
|---|---|---|
| FPEH( ){ | | |
| Type | 4 | FPEH type |
| FC | 2 | Including fragmentation control information |
| If (MAC header == AGMH){ | | |

TABLE 7-continued

| Syntax | Size (bits) | Contents |
|---|---|---|
| SN | 10 | SN is maintained in units of connection. In association with non-ARQ connection, SN indicates a sequence number of MAC PDU including payload, and SN value is increased one by one for each MAC PDU. In association with ARQ connection, SN denotes an ARQ block sequence number. |
| AFP | 1 | Including ARQ feedback poll indicator. '0' indicates inclusion of ARQ feedback poll. '1' indicates inclusion of ARQ feedback poll related to connection indicated by AGMH or MEH (in case of multiplexing) |
| RI | 1 | Including ARQ rearrangement information indicator, '0' indicates the ARQ rearrangement is not indicated. '1' indicates that ARQ rearrangement is indicated. |
| LI | 1 | Length indicator. '0' indicates that the length field is 11 bits long. '1' indicates that the length field is 14 bits long. |
| If(RI==1){ | 1 | Last ARQ sub-block indicator. '0' indicates that a single ARQ block not contained in the corresponding MAC PDU indicates the last ARQ subblock. '1' indicates that a single ARQ block contained in the corresponding MAC PDU indicates the last ARQ subblock. |
| LSI | 11 | Sub-sequence number of the first ARQ subblock |
| SSN | | |
| }} | | |
| Do{ | 1 | |
| End | | |
| If(End == 0){ | | |
| If(LI == 0){ | 11 | |
| Length | | This field indicates a length of either an SDU or a SDU fragment of the fragmented SDU. |
| }else{ | 1 | |
| Length | | This field indicates a length of either an SDU or a SDU fragment of the fragmented SDU. |
| } | | |
| } | | |
| }while(!End) | | |
| Reserved | Variable | |
| } | | |

Example of FPEH (Third Embodiment)

The third embodiment of the present invention relates to a method for determining whether an MEH is contained in a MAC PDU received by the receiver, and determining the FPEH length field according to a value of the MEH length indicator. Therefore, when decoding a header of the MAC PDU in the third embodiment of the present invention, a process for confirming whether an MEH is contained in the MAC PDU and a process for confirming a value of the MEH length indicator are carried out. If the MEH exists and the MEH length indicator is set to '1' according to the decoded result, the size of FPEH length field is determined to be the extended size. Otherwise, if the MEH length indicator is not set to '1' according to the decoded result, the size of FPEH length field is determined to be a basic size. Table 8 shows an exemplary FPEH for use in the third embodiment of the present invention.

TABLE 8

| Syntax | Size (bits) | Contents |
|---|---|---|
| FPEH( ){ | | |
| Type | 4 | FPEH type |
| FC | 2 | Including fragmentation control information |
| If (MAC header == AGMH){ | | |
| SN | 10 | SN is maintained in units of connection. In association with non-ARQ connection, SN indicates a sequence number of MAC PDU including payload, and SN value is increased one by one for each MAC PDU. In association with ARQ connection, SN denotes an ARQ block sequence number. |
| AFP | 1 | Including ARQ feedback poll indicator. '0' indicates inclusion of ARQ feedback poll. '1' indicates inclusion of ARQ feedback poll related to connection indicated by AGMH or MEH (in case of multiplexing) |
| RI | 1 | Including ARQ rearrangement information indicator, '0' indicates the ARQ rearrangement is not indicated. '1' indicates that ARQ rearrangement is indicated. |
| If(RI==1){ | | |
| LSI | 1 | Last ARQ sub-block indicator. '0' indicates that a single ARQ block not contained in the corresponding MAC PDU indicates the last ARQ subblock. '1' indicates that a single ARQ block contained in the corresponding MAC PDU indicates the last ARQ subblock. |
| SSN | 11 | Sub-sequence number of the first ARQ subblock |
| }} | | |
| Do{ | | |
| End | 1 | |
| If(End == 0){ | | |
| If(MEH)&& LIin MEH{ | | If MEH exists and the length indicator (LI) for the corresponding flow of MEH is set to 1, the size of FPEH length field of the corresponding flow is extended to 14 bits. |
| Length | 14 | This field indicates a length of either an SDU or a SDU fragment of the fragmented SDU. |
| }else{ | | |
| Length | 11 | This field indicates a length of either an SDU or a SDU fragment of the fragmented SDU. |
| } | | |
| } | | |
| }while(!End) | | |
| Reserved | Variable | |
| } | | |

TABLE 9

| Syntax | Size (bits) | Contents |
|---|---|---|
| FPEH( ){ | | |
| Type | 4 | FPEH type |
| FC | 2 | Including fragmentation control information |
| If (MAC header == AGMH){ | | |
| SN | 10 | SN is maintained in units of connection. In association with non-ARQ connection, SN indicates a sequence number of MAC PDU including payload, and SN value is increased one by one for each MAC PDU. In association with ARQ connection, SN denotes an ARQ block sequence number. |
| AFP | 1 | Including ARQ feedback poll indicator. '0' indicates inclusion of ARQ feedback poll. '1' indicates inclusion of ARQ feedback poll related to connection indicated by AGMH or MEH (in case of multiplexing) |
| RI | 1 | Including ARQ rearrangement information indicator, '0' indicates the ARQ rearrangement is not indicated. '1' indicates that ARQ rearrangement is indicated. |
| If(RI==1){ | | |
| LSI | 1 | Last ARQ sub-block indicator. '0' indicates that a single ARQ block not contained in the corresponding MAC PDU indicates the last ARQ subblock. '1' indicates that a single ARQ block contained in the corresponding MAC PDU indicates the last ARQ subblock. |
| SSN | 11 | Sub-sequence number of the first ARQ subblock |
| }} | | |
| Do{ | | |
| End | 1 | |
| If(End == 0){ | | |
| If(MLEH && MEH && LI{ | | If MLEH or MEH exists and the length indicator (LI) for the corresponding flow of MEH is set to 1, the size of FPEH length field of the corresponding flow is extended to 14 bits. |
| Length | | This field indicates a length of either an SDU or a SDU fragment of the fragmented SDU. |
| }elseif(MLEH && ! MEH){ | | If MLEH exists but MEH does not exist, the size of the corresponding FPEH length field is extended to 14 bits. |
| Length | 14 | This field indicates a length of either an SDU or a SDU fragment of the fragmented SDU. |
| }else{ | | If the above-mentioned conditions are not provided, the size of the FPEH length field is set to 11 bits. |
| Length | 11 | This field indicates a length of either an SDU or a SDU fragment of the fragmented SDU. |
| } | | |
| } | | |
| }while(!End) | | |
| Reserved | Variable | |
| } | | |

Example of FPEH (Fourth Embodiment)

The fourth embodiment of the present invention relates to a method for determining whether an MLEh or MEH is contained in a MAC PDU received by the receiver, and determining the FPEH length field according to a value of the MEH length indicator. Therefore, when decoding a header of the MAC PDU in the fourth embodiment of the present invention, a process for confirming whether an MLEH or MEH is contained in the MAC PDU and a process for confirming a value of the MEH length indicator are carried out. If the MLEH or MEH exists and the MEH length indicator is set to '1' according to the decoded result, the size of FPEH length field is determined to be the extended size. Otherwise, if the MLEH or MEH length indicator is not set to '1' according to the decoded result, the size of FPEH length field is determined to be a basic size. Table 9 shows an exemplary FPEH for use in the fourth embodiment of the present invention.

Modified Embodiment

The above-mentioned embodiments relate to a method for determining the size field pertaining to a length field contained in an FPEH of the MAC PDU. However, if not only the FPEH but also a different extended header for transmitting ARQ information and fragmentation/packing information is defined, the same method can also be applied to the above-mentioned different extended header.

For example, provided that an FPEH can be used either in initial ARQ block transmission or in ARQ block retransmission without rearrangement, an additional rearrangement FPEH (RFPEH) can be defined for the case of 'ARQ block with rearrangement'. Provided that RFPEH is defined, and the RFPEH and FPEH are not simultaneously transmitted, the RFPEH length field may have the same size (e.g., 11 bits or 14 bits) as in the above-mentioned embodiments.

Wireless Communication System

Figure 9:
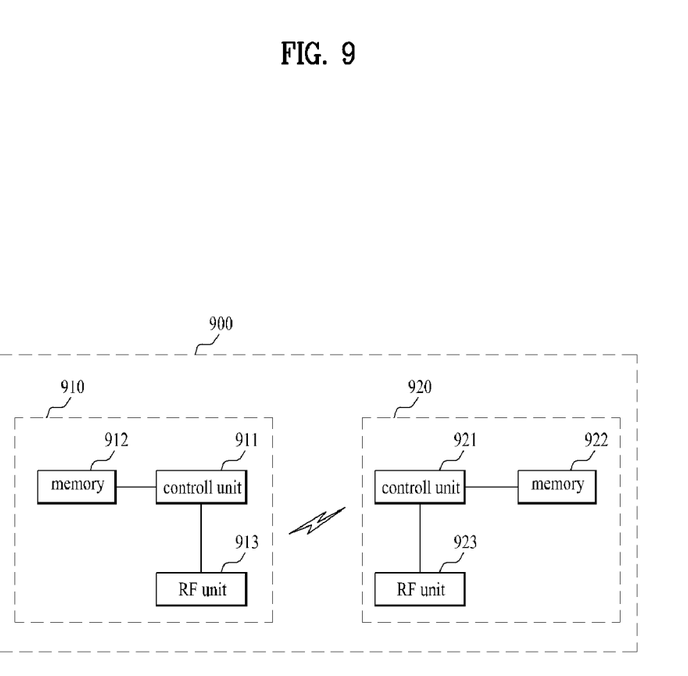
FIG. 9 is a block diagram illustrating a wireless communication system according to the embodiments of the present invention.

FIG. 9 is a block diagram illustrating a wireless communication system applicable to the embodiments of the present invention. Referring to FIG. 9, the wireless communication system 900 may include an eNode B (or a base station (BS)) 910 and a user equipment (UE) 920.

The eNode B 910 includes a control unit 911, a memory 912, and a radio frequency (RF) unit 913.

The control unit 911 can implement the proposed functions, processes and/or methods. Layers of radio interface protocol can be implemented by the control unit 911.

The control unit 911 may manage the MAC layer and may construct or decode the MAC PDU.

The memory 912 is connected to the control unit 911 so as to construct the MAC PDU, and stores a protocol or parameter for decoding. The RF unit 913 is connected to the control unit 911 so as to transmit and/or receive RF signals.

The UE 920 includes a control unit 921, a memory 922 and an RF unit 923.

The control unit 921 can implement the proposed functions, processes and/or methods. Layers of radio interface protocol can be implemented by the control unit 921. The control unit 921 may manage the MAC layer and may construct or decode the MAC PDU.

The memory 912 is connected to the control unit 921 so as to construct the MAC PDU, and stores a protocol or parameter for decoding. The RF unit 913 is connected to the control unit 921 so as to transmit and/or receive RF signals.

The control unit 911 or 921 may include an application-specific integrated circuit (ASIC), another chipset, a logical circuit, and/or a data processor. The memory 912 or 922 may include a read-only memory (ROM), a random access memory (RAM), a flash memory, a memory card, a storage medium, and/or another storage device. The RF unit 913 or 923 may include a baseband circuit for processing RF signals. If the embodiment according to the present invention is implemented by software, the above-mentioned scheme may be implemented by a module (procedure or function, etc.) which performs functions or operations as described above. The module may be stored in the memory 912 or 922 and then may be driven by the control unit 911 or 921. The memory 912 or 922 may be located inside or outside the control unit 911 or 921, and may be connected to the control unit 911 or 912 through various well known means.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The invention claimed is:

1. A method for receiving a medium access control (MAC) protocol data unit (PDU) by a receiver in a wireless communication system, the method comprising:
   receiving the MAC PDU from a transmitter, the MAC PDU including a header and a payload,
   wherein the header includes a fragmentation and packing extended header (FPEH) containing:
      a first length field indicating a length of a service data unit (SDU) or lengths of fragmented SDUs in the MAC PDU, and
      a first length indicator indicating the size of the first length field;
   decoding the header by checking the first length indicator; and
   when the first length indicator indicates an extended size, determining whether the size of the first length field in the FPEH is the extended size.

2. The method of claim 1, wherein the first length field has a basic size of 11 bits, and has an extended size of 14 bits.

3. The method of claim 1, wherein, in uplink, the transmitter is a user equipment (UE), and the receiver is an eNode B.

4. The method of claim 1, wherein, in downlink, the transmitter is an eNode B, and the receiver is a user equipment (UE).

5. A user equipment (UE) for receiving a medium access control (MAC) protocol data unit (PDU) in a wireless communication system, the user equipment (UE) comprising:
   a memory;
   a radio frequency (RF) unit configured to transmit and receive an external signal and a radio frequency (RF) signal; and
   a control unit configured to
      receive the MAC PDU from an eNodeB, the MAC PDU including a header and a payload, the header including:
         a fragmentation and packing extended header (FPEH) containing a first length field indicating a length of a service data unit (SDU) or lengths of fragmented SDUs in the MAC PDU, and
         a first length indicator indicating the size of the first length field, decode the header by checking the first length indicator, and
      when the first length indicator indicates an extended size, determine the size of the first length field contained in the FPEH is the extended size.

6. The user equipment (UE) of claim 5, wherein the first length field has a basic size of 11 bits, and has an extended size of 14 bits.

* * * * *